No. 606,681. Patented July 5, 1898.
L. D. PARMLEY.
THRESHING MACHINE.
(Application filed Feb. 26, 1897.)

(No Model.)

WITNESSES
Thomas L. Pole
B. C. Pole

INVENTOR
Lemuel D. Parmley.
by Hubert W. T. Jenner.
Attorney

UNITED STATES PATENT OFFICE.

LEMUEL D. PARMLEY, OF WAYNESBOROUGH, PENNSYLVANIA, ASSIGNOR TO CHARLES J. DANIELSON AND MINNIE D. ELLINGSON, OF HAMLET, INDIANA.

THRESHING-MACHINE.

SPECIFICATION forming part of Letters Patent No. 606,681, dated July 5, 1898.

Application filed February 26, 1897. Serial No. 625,213. (No model.)

*To all whom it may concern:*

Be it known that I, LEMUEL D. PARMLEY, a citizen of the United States, residing at Waynesborough, in the county of Franklin and State of Pennsylvania, have invented certain new and useful Improvements in Threshing-Machines; and I do hereby declare the following to be a full, clear, and exact description of the invention, such as will enable others skilled in the art to which it appertains to make and use the same.

This invention relates to threshing-machines; and it consists in the novel construction and combination of the parts hereinafter fully described and claimed.

Figure 1:
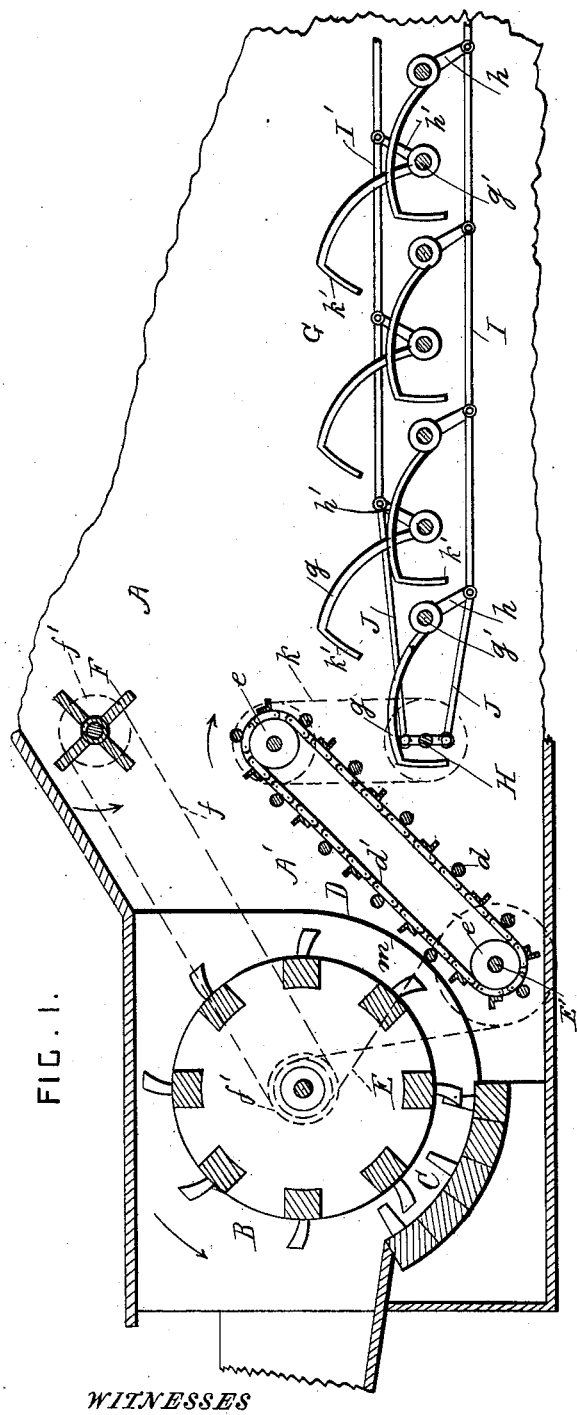
Figure 2:
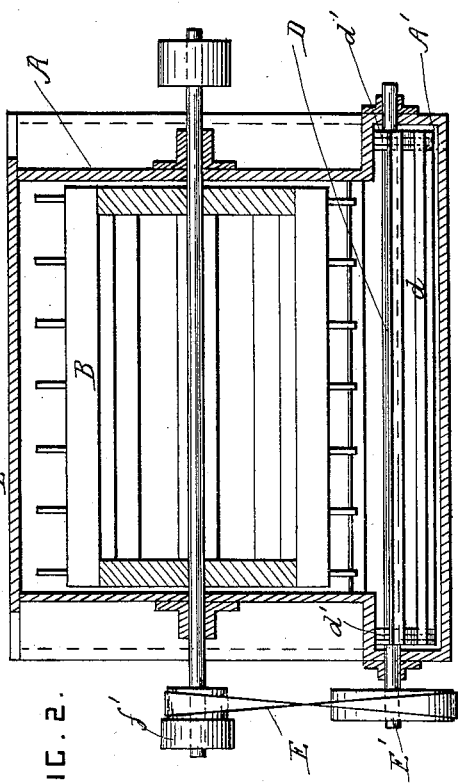

In the drawings, Figure 1 is a longitudinal section through the front portion of a threshing-machine. Fig. 2 is a cross-section through the cylinder.

A is a portion of the casing of a threshing-machine. B is the toothed cylinder, and C is the concave. These parts are of any approved construction. The casing is made with an offset portion A' immediately behind the cylinder, so that the casing is wider behind the cylinder than at the cylinder.

D is an endless grate formed of cross-bars $d$, attached to the conveyer or drive chains $d'$, which pass over rollers $e$ and $e'$. The grate D is supported in an upwardly and rearwardly inclined position close behind the cylinder in the offset portion A' of the casing, and the said grate is of greater width than the cylinder, so that the full width of the cylinder may be effective for threshing and so that the grate may catch the grains which diverge outwardly at the ends of the cylinder. The offset portion A' of the casing extends under the rear part of the cylinder, and its upper front part $m$ is curved substantially concentric with the cylinder. The lower front end of the grate D is arranged under the rear part of the cylinder and under the part $m$ near the concave, but does not extend below the concave.

The cross-bars $d$ are made of such form as will cause the grain which is thrown off by the cylinder to be deflected and separated from the straw when it strikes them. By preference the cross-bars $d$ are round and angle-shaped bars placed alternately, but other forms of cross-bars may be used.

The front end of the grate D is arranged below the cylinder and at a short distance from the concave, so that all the grain which flies off from the concave must strike the grate. The bars of the grate are arranged at such short distances apart that the grain is deflected downward and does not fly between them.

Motion is imparted to the grate by any approved driving mechanism—as, for instance, by a crossed belt E, passing over pulleys on the cylinder-shaft and on one of the roller-shafts E'.

F is a cross-shaped beater journaled in the casing above the grate. This beater is revolved continuously in the opposite direction from the rollers which support the grate. The beater is revolved by any approved driving mechanism—as, for instance, by a belt $f$, passing over pulleys $f'$ on the cylinder and beater shafts.

G is a straw-shaker arranged behind the grate D. This shaker consists of rows of similar curved arms $g$, secured on shafts $g'$, which are journaled in the casing one behind the other. The shafts $g'$ have arms $h$ and $h'$ secured to them at one end of the rows of arms $g$. The arms $h$ project downward, and the arms $h'$ project upward, and they are attached to the said shafts alternately. The curved arms are arranged so that when the arms on one shaft are raised the arms on the next adjacent shaft are lowered.

H is a crank-shaft provided with two cranks arranged on opposite sides of its center.

I are coupling-rods connecting together all the downwardly-projecting arms $h$, and I' are coupling-rods connecting together all the upwardly-projecting arms $h'$.

J are connecting-rods which connect the respective cranks with the coupling-rods I and I'.

The arms $g$ all have downwardly-projecting end portions $k'$, and the arms $g$ of each rear row overlap the shaft next in front of of them and work between the arms next in front of them.

Rotary motion is imparted to the crank-shaft by any approved driving mechanism, such as a belt $k$, passing over pulleys on the crank-shaft and on one of the grate-roller shafts.

The grain is threshed between the cylinder and concave in the usual manner. The grain flies off from the cylinder and is deflected by the cross-bars of the grate. The grain is collected under the grate by any approved devices for that purpose, which are not shown in the drawings. The straw is forced against the endless traveling grate and is carried upward by it and discharged onto the straw-shaker. The beater also assists in discharging the straw onto the straw-shaker and also loosens it up and beats the loose grain out of the straw. The straw is shaken on the straw-shaker to dislodge the grains which are still mixed with it. The grains fall between the curved arms, and the straw is worked to the rear of the machine and is discharged therefrom.

What I claim is—

1. In a threshing-machine, the combination, with shafts arranged one behind the other, of rows of arms carried by the said shafts and operating to shake the straw, arms secured to the said shafts and arranged to project upward and downward alternately, coupling-rods connecting all the upwardly-projecting arms and all the downwardly-projecting arms, a crank-shaft provided with two cranks at opposite sides of its center, and connecting-rods arranged between the respective cranks and coupling-rods, substantially as set forth.

2. In a threshing-machine, the combination with shafts arranged one behind the other, of arms carried by the said shafts and operating to shake the straw, the arms of each rear shaft being arranged to overlap the shaft in front of them, coupling devices connecting the arms on each alternate shaft in two series, and driving mechanism for raising the arms of one series when the arms of the other series are depressed, substantially as set forth.

In testimony whereof I affix my signature in presence of two witnesses.

LEMUEL D. PARMLEY.

Witnesses:
CHARLES J. DANIELSON,
HJALMAR A. ELLINGSON.